(12) United States Patent
Majersik et al.

(10) Patent No.: US 7,706,941 B2
(45) Date of Patent: Apr. 27, 2010

(54) METHOD AND SYSTEM FOR COORDINATING A VEHICLE STABILITY CONTROL SYSTEM WITH A SUSPENSION DAMPER CONTROL SUB-SYSTEM

(75) Inventors: Loren E. Majersik, Ann Arbor, MI (US); Kerfegar K. Katrak, Fenton, MI (US); Steven D. Palazzolo, Clinton Township, MI (US); Mark A. Seifert, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 141 days.

(21) Appl. No.: 11/458,697

(22) Filed: Jul. 20, 2006

(65) Prior Publication Data
US 2008/0082234 A1    Apr. 3, 2008

(51) Int. Cl.
*B60G 23/00* (2006.01)
*B60G 17/00* (2006.01)
*G06F 17/00* (2006.01)

(52) U.S. Cl. .............. 701/37; 701/1; 701/38; 701/39; 701/40; 701/91; 280/5.5; 280/5.501; 280/5.502; 280/5.503; 280/5.504; 280/5.505; 280/5.506; 280/5.507; 280/5.508; 280/5.509; 280/5.51; 280/5.511; 280/5.512; 280/5.513

(58) Field of Classification Search ............ 701/1, 701/37–40, 91; 280/5.5–5.513
See application file for complete search history.

(56) References Cited

U.S. PATENT DOCUMENTS

| 4,550,286 A | 10/1985 | Holland et al. |
| 4,754,824 A | 7/1988 | Olsson |

(Continued)

FOREIGN PATENT DOCUMENTS

DE    4430364 B4    3/2005

(Continued)

OTHER PUBLICATIONS

Katrak et al., U.S. Appl. No. 11/157,207, filed Jun. 20, 2005, "Vehicle State Determination Integrity," assigned to GM Global Technology Operations, Inc.

(Continued)

*Primary Examiner*—Jack W. Keith
*Assistant Examiner*—Chuong P Nguyen

(57) ABSTRACT

A method and system for coordinating a vehicle stability control system with a suspension damper control sub-system includes a plurality of dampers, each of which are controlled directly by the suspension damper control sub-system. A plurality of sensors sense a plurality of vehicle parameters. A supervisory controller generates vehicle damper commands based on the plurality of vehicle parameters for each of the dampers. A damper controller in electrical communication with the supervisory controller receives the vehicle damper commands and generates sub-system damper commands based on a portion of the plurality of vehicle parameters for each of the dampers. The damper controller also determines if any of the vehicle damper commands for any one of the dampers has authority over the corresponding sub-system damper command. The damper controller then determines a modified sub-system damper command for each of the dampers in which the corresponding vehicle damper command has authority, wherein the modified sub-system damper command is based on the vehicle damper command and the sub-system damper command.

7 Claims, 2 Drawing Sheets

U.S. PATENT DOCUMENTS

| | | | |
|---|---|---|---|
| 4,800,974 | A | 1/1989 | Wand et al. |
| 5,037,128 | A * | 8/1991 | Okuyama et al. ........ 280/5.507 |
| 5,150,916 | A | 9/1992 | Petrofes et al. |
| 5,324,068 | A | 6/1994 | Kallenbach et al. |
| 5,444,621 | A | 8/1995 | Matsunaga et al. |
| 5,485,417 | A * | 1/1996 | Wolf et al. .................... 701/37 |
| 5,570,289 | A | 10/1996 | Stacey et al. |
| 5,787,375 | A | 7/1998 | Madau et al. |
| 6,097,999 | A | 8/2000 | Shal et al. |
| 6,219,602 | B1 * | 4/2001 | Badenoch et al. ............. 701/37 |
| 6,226,581 | B1 | 5/2001 | Reimann et al. |
| 6,459,971 | B1 | 10/2002 | Kurishige et al. |
| 6,505,108 | B2 * | 1/2003 | Bodie et al. .................. 701/41 |
| 6,725,135 | B2 | 4/2004 | McKeown et al. |
| 2002/0013647 | A1 | 1/2002 | Kawazoe et al. |
| 2002/0026270 | A1 | 2/2002 | Kurishige et al. |
| 2003/0001346 | A1 * | 1/2003 | Hamilton et al. ......... 280/5.515 |
| 2003/0182036 | A1 * | 9/2003 | Shal et al. .................... 701/37 |
| 2003/0195679 | A1 | 10/2003 | McKeown et al. |
| 2004/0024509 | A1 | 2/2004 | Salib et al. |
| 2004/0128044 | A1 | 7/2004 | Hac |
| 2004/0133321 | A1 | 7/2004 | Ghoneim et al. |
| 2004/0215380 | A1 * | 10/2004 | Song ........................... 701/37 |
| 2004/0220708 | A1 | 11/2004 | Owen et al. |
| 2005/0113998 | A1 * | 5/2005 | Kim ........................... 701/37 |
| 2005/0246085 | A1 | 11/2005 | Salib et al. |
| 2005/0256628 | A1 | 11/2005 | Salib et al. |
| 2006/0105670 | A1 | 5/2006 | Seymour |
| 2006/0273657 | A1 | 12/2006 | Wanke et al. |
| 2006/0287790 | A1 * | 12/2006 | Seifert et al. .................. 701/37 |

FOREIGN PATENT DOCUMENTS

DE  10360666 A1  7/2005

OTHER PUBLICATIONS

USPTO, Prosecution History for U.S. Appl. No. 11/157,208.

* cited by examiner

METHOD AND SYSTEM FOR COORDINATING A VEHICLE STABILITY CONTROL SYSTEM WITH A SUSPENSION DAMPER CONTROL SUB-SYSTEM

TECHNICAL FIELD

This invention relates to vehicle stability control systems and, more particularly, to methods and systems for coordinating a vehicle stability control system with a suspension damper control sub-system.

BACKGROUND OF THE INVENTION

Steering stability and performance of a vehicle are largely characterized by the vehicle's understeer and oversteer behavior. The vehicle is in an understeer condition if the vehicle yaw is less than the operator steering input, where turning the steering wheel more does not correct the understeer condition because the wheels are saturated. The vehicle is in an oversteer condition if the vehicle yaw is greater than the operator steering input. Surfaces such as wet or uneven pavement, ice, snow or gravel also present vehicle stability and handling challenges to the operator. Similarly, in a panic or emergency situation, such as during obstacle avoidance, an operator may react by applying too much steering or failing to counter-steer to bring the vehicle back to its intended path. In any of these cases, the actual vehicle steering path deviates from the intended steering path.

Vehicle stability controls have progressed from first generation systems based upon braking and traction control (braking and powertrain torque management) technologies to more recent systems including independent and coordinated controls of brake, powertrain, steering and suspension damping sub-systems. Typically, distributed control modules are employed to directly interface with respective actuators to effect the desired sub-system controls.

Semi-active suspension systems are incorporated into some modern vehicles and are generally characterized by dampers that are controlled to change the suspension characteristics of the vehicle based on road conditions, vehicle speed, yaw rate and other considerations. Variable fluid-based dampers are known having discrete damping states and continuously variable damping states which affect both jounce and rebound response of the suspension system. Variability in damping may be attained by variable orifice devices or controlled viscosity fluids (e.g., magnetorheological (MR) or electrorheological (ER)) within the damping device. Variable dampers are used predominantly to achieve low speed ride comfort and high speed handling enhancement (ride and handling). However, variable damping techniques are known to enhance vehicle stability in certain understeer and oversteer situations and may be implemented as part of an overall vehicle stability control.

There is a need to coordinate the interaction between the vehicle stability control system and the suspension damper control sub-system in a way that is efficient, yet clear that the vehicle stability control system has ultimate authority when necessary.

SUMMARY OF THE INVENTION

A vehicle is equipped with a plurality of dampers and a computer based vehicle stability supervisory control system that is in communication with a suspension damper control sub-system. The vehicle also includes a plurality of sensors for sensing a plurality of vehicle parameters. A supervisory controller generates vehicle damper commands based on the plurality of vehicle parameters for each of the dampers. A damper controller generates sub-system damper commands based on a portion of the plurality of vehicle parameters for each of the dampers. The damper controller determines if any of the vehicle damper commands for any one of the dampers has authority over the corresponding sub-system damper command, and determine a modified sub-system damper command for each of the dampers in which the corresponding vehicle damper command has authority, wherein the modified sub-system damper command is determined based on the vehicle damper command and the sub-system damper command.

A method for coordinating the vehicle stability control system with a suspension damper control sub-system that controls a plurality of dampers associated with the vehicle includes sensing a plurality of vehicle parameters and generating vehicle damper commands based on the plurality of vehicle parameters for each of the dampers, the vehicle damper commands being generated for receipt by the suspension damper control sub-system. The method also includes the step of generating sub-system damper commands based on a portion of the plurality of vehicle parameters for each of the dampers. Still further, the method includes determining if any of the vehicle damper commands for any one of the dampers has authority over the corresponding sub-system damper command and, if so, determining a modified sub-system damper command for each of the dampers in which the corresponding vehicle damper command has authority, the modified sub-system damper command being determined based on the vehicle damper command and the sub-system damper command.

DESCRIPTION OF THE PREFERRED EMBODIMENT

Figure 1:
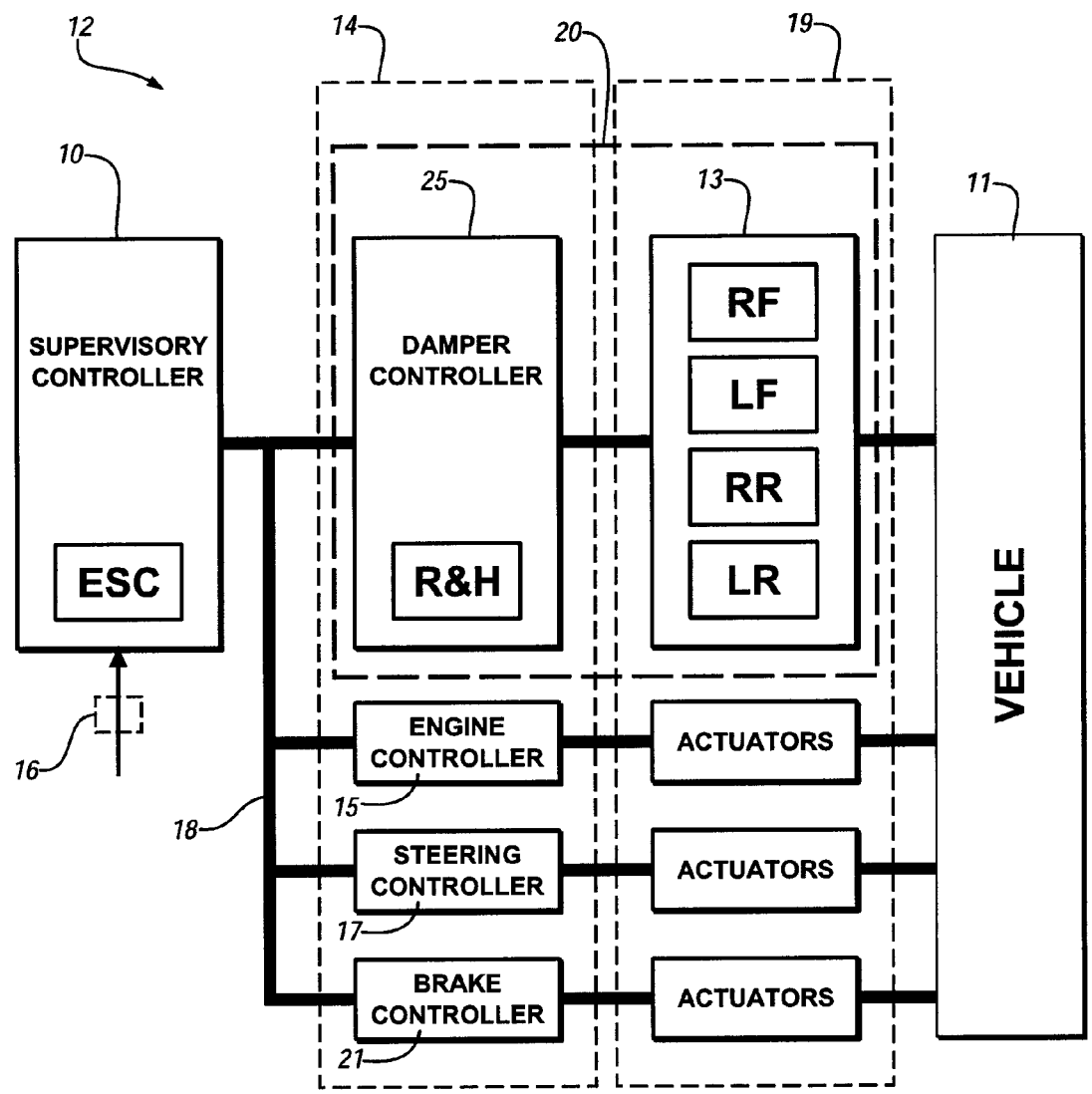
FIG. 1 is a block schematic diagram illustrating a vehicle architecture suitable for implementing the system of the present invention.

A vehicle stability control system 12 is schematically illustrated in FIG. 1 and includes vehicle 11 and vehicle stability enhancement controller (supervisory controller) 10. A plurality of actuators 19 associated with various vehicle sub-systems effect various forces upon vehicle 11 to enhance stability and maintain an intended path in response to such inputs as steering wheel angle, vehicle speed, wheel speed and vehicle yaw rate, among others. For example, in an active front steering system, the steering angle of the front vehicle wheels is affected by way of a steering actuator sub-system that is commanded to effect the desired vehicle stability enhancement. In a braking/powertrain vehicle stability enhancement sub-system, individual wheel braking and powertrain torque may be affected by way of modulated hydraulic brake pressure and engine output torque control through a variety of well-known techniques (e.g., spark timing, cylinder deactivation, engine fueling, etc.). In a semi-active suspension sub-system, suspension damping characteristics may be altered in a manner to effect a desired vehicle stability enhancement.

Each such vehicle sub-system has associated therewith one or more sub-system control modules 14. Control modules are standard automotive computer-based devices with standard control and logic circuitry which may include a micro-controller including arithmetic logic unit (ALU) and memory devices including read-write or random access memory device (RAM), read-only memory (ROM) devices in which are stored a plurality of routines for carrying out sub-system control and diagnostic operations, including routines for carrying out operations for implementing various aspects of the present invention. Each routine includes a sequence of instructions that are executed by a microprocessor following pre-established events or interrupts or on a timed basis such as in standard executory loops. Such control modules are generally well-known to those skilled in the art.

Vehicle sub-systems are operable in a distributed control fashion wherein each of the control modules 14 associated with a particular sub-system is responsible for normal control functions thereof by commanding the control of the respective sub-system actuators 19. Such normal control functions generally are not related to vehicle dynamics control other than in a passive, contributory sense. Engine controller 15, for example, is responsible for effecting an amount of output torque in response to an operator demand and for torque management during ratio shifting of a multi-speed ratio automatic transmission. The engine controller also normally performs emission critical and fuel economy critical functions which may implicate spark timing, cylinder deactivation, engine fueling, etc. Brake controller 21 is normally responsible for brake application in accordance with operator applied brake pedal pressure and anti-lock modulation in accordance with independent and comparative wheel speed measurements. Steering controller 17 is responsible for variable assist—reducing steering effort during low speed and parking maneuvers and progressively increasing steering effort as vehicle speed increases. A damper controller 25 likewise is responsible for tuning the ride characteristics of the vehicle in accordance with vehicle speed, predominantly for operator comfort through reduced damping at low vehicle speeds and for improved highway feel through increased damping at higher vehicle speeds.

Various input signals 16 are provided to the supervisory controller 10 for use in vehicle stability enhancement routines. Vehicle inputs may include, for example, yaw rate, lateral acceleration and vehicle speed. Supervisory controller 10 in turn provides authority control commands over a controller area network (CAN) bus 18 for overriding, modifying or adapting the normal control of the sub-system controllers 14 in the interest of implementing vehicle stability enhancing control of the various sub-system actuators 19.

Supervisory controller 10 may include lower-level supervisory controllers (not separately shown) corresponding to the various stability enhancing sub-systems (e.g., wheel torque (i.e., brake & engine torque) supervisor, steering supervisor and suspension supervisor) and oversees the coordination of these various stability enhancing control sub-system supervisors. The various sub-system controls, collectively or individually, in accordance with a particular vehicle application, are generally referred to as electronic stability control and illustrated as functionally related to supervisory controller 10 as ESC.

The schematic block diagram of FIG. 1 includes more detailed illustration of an exemplary suspension damper control sub-system 20 in accordance with the present invention. The system includes damper controller 25 and a plurality of suspension dampers 13 individually associated with the respective suspension corners of the vehicle 11. Damper control sub-system 20 includes the normal control functions generally referred to as ride and handling, illustrated as functionally related to damper controller 25 as R&H. The vehicle 11 provides a plurality of signals from sensors or derivations, including vehicle yaw rate, vehicle lateral acceleration, vehicle speed, steering wheel angle and individual damper positions. The plurality of suspension dampers 13 includes, in the present example of a conventional four wheel position vehicle, at least one suspension damper corresponding to each corner of the vehicle. These corners are referred to positionally and are correspondingly labeled in FIG. 1 as right-front (RF), left-front (LF), right-rear (RR) and left-rear (LR). Each damper effects a damping force upon vehicle 11 in accordance with damper commands, for example control currents for effecting a desired damping response in an MR based damper.

Generally under normal vehicle operation, suspension control is preferably provided in accordance with normal ride and handling (R&H) objectives, and open open-loop controls are employed wherein all the dampers at each corner of the vehicle are controlled relative to inputs such as lateral acceleration, vehicle speed, steering wheel angle and damper position. Such open loop controls are effective during linear driving conditions (e.g., substantially neutral oversteer/ understeer condition). One skilled in the art will appreciate that such controls are generally designed to effect a baseline total vehicle damping and baseline distribution thereof to each vehicle corner. Total vehicle damping force generally increases with increasing vehicle velocity and decreases with decreasing vehicle velocity to effect R&H objectives. Additionally, redistribution of the total vehicle damping force will be effected based substantially upon steering input. Such normal R&H damper control commands are, as described herein above, determined by damper controller and implemented thereby, for example, as current control commands issued to each of the RF, LF, RR and LR damper actuators in accordance with a R&H calibration as further described herein below.

Non-linear driving conditions wherein vehicle oversteer or understeer behavior or a transitional neutral steer behavior out of or intermediate oversteer and understeer states are determined and counteracted by ESC controls of the supervisory controller 10. Such ESC control includes preferential implementation of closed-loop active damper control of some or all of the vehicle corner dampers. ESC damper control is effective to determine an effective total vehicle damping, and front-to-rear and side-to-side distributions thereof. One skilled in the art will recognize that understeer behavior can be improved with a damping distribution weighted toward the rear of the vehicle and that oversteer behavior can be improved with a damping distribution weighted toward the front of the vehicle. Furthermore, certain of the vehicle corner and damper motion combinations may be determined critical in accordance with the vehicle turning direction and benefiting from such ESC damper control whereas certain of the vehicle corner and damper motion combinations may be determined non-critical in accordance with the vehicle turning direction and may be adequately controlled in accordance with normal ride and handling objectives with the R&H controls. ESC damper control commands are determined by supervisory controller 10 and implemented by the damper controller 25, for example, as current control commands issued to each of the RF, LF, RR and LR damper actuators in accordance with a coordination method as further described herein below.

In a preferred embodiment, the R&H controls will be used to command the damping force of the non-critical vehicle corner and damper motion combinations. And, the ESC damper controls will be used to command the damping force of the critical vehicle corner and damper motion combinations. Therefore, during normal linear driving conditions, all vehicle corner damper and damper direction combinations are preferably controlled in accordance with a purely R&H calibration wherein the R&H control commands determined by damper controller 25 are provided to the respective damper actuators. During non-linear driving conditions, including oversteer, understeer and transitional neutral steer conditions, all vehicle corner damper and damper direction combinations are preferably controlled in accordance with a coordination method wherein the R&H control commands determined by damper controller 25 are provided to the respective damper actuators for non-critical vehicle corner and damper motion combinations and whereas the ESC control commands determined by supervisory controller 10 are provided to the respective damper actuators for critical vehicle corner and damper motion combinations. By the present invention, the ESC damper control is implemented on the dampers and in the direction of damper motion critical to the yaw dynamics of the vehicle thereby minimizing the effects of such control on potentially destabilizing wheel control events which may occur during the application of other ESC control sub-systems, e.g., wheel torque control and active steering, or disruptive road input.

Figure 2:
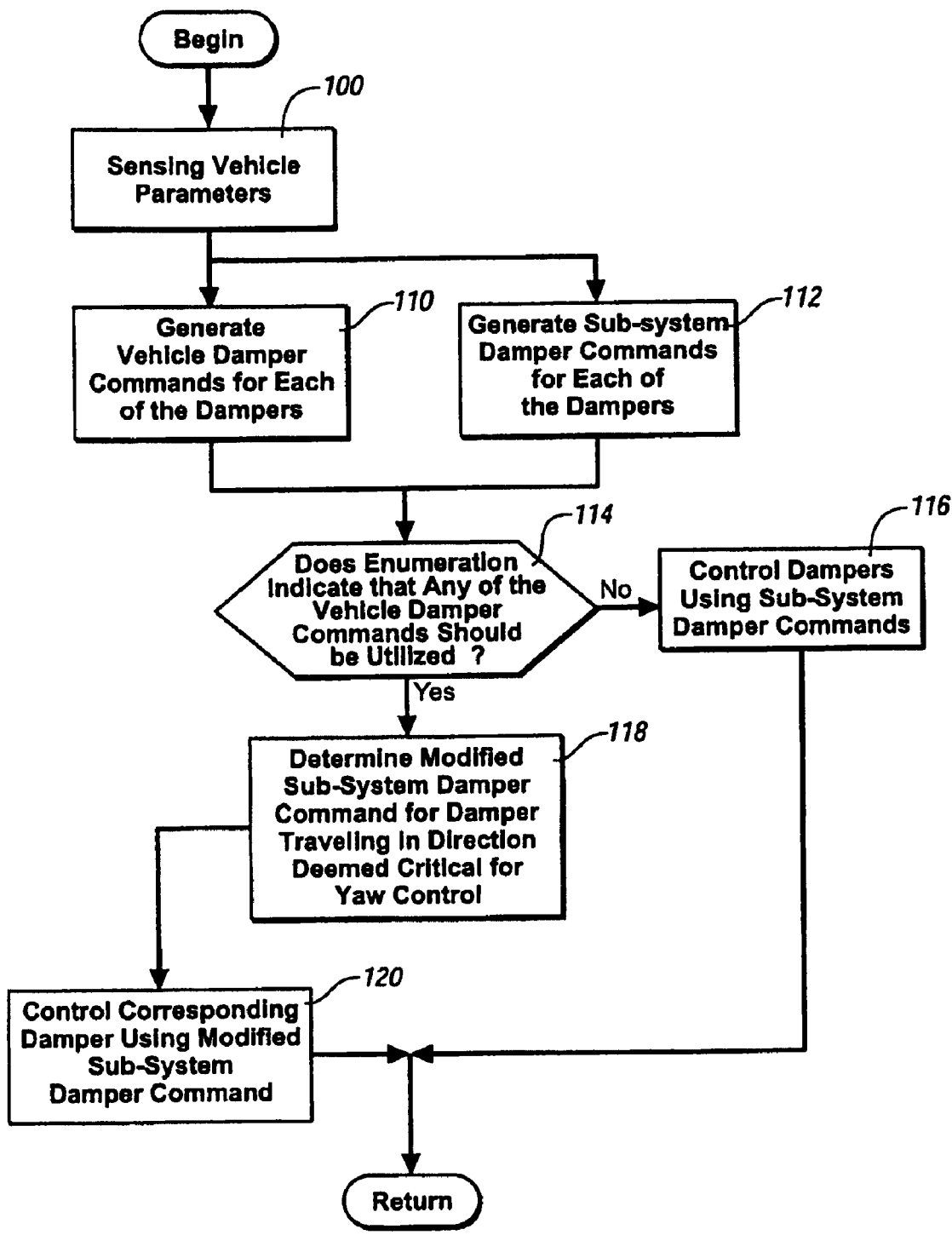
FIG. 2 is a flow chart representing exemplary functions executed in one or more computer based controllers in carrying out the method of the present invention.

FIG. 2 illustrates functions carried out in the supervisory controller 10 and the damper controller 25 in effecting the controls of the present invention. As will be appreciated by one of ordinary skill in the art, the flowchart represents control logic which may be implemented using hardware, software, or combination of hardware and software. For example, the various functions may be performed using a programmed microprocessor.

The control logic may be implemented using any of a number of known programming or processing techniques or strategies and is not limited to the order or sequence illustrated. For instance, interrupt or event-driven processing is typically employed in real-time control applications, such as control of an engine or vehicle subsystem, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The method begins at 100 by sensing a plurality of vehicle parameters. These include, but are not limited to, yaw rate, lateral acceleration and vehicle speed. Based on these parameters, the supervisory controller 10 generates vehicle damper commands for each of the dampers, as shown at step 110. In the preferred embodiment, the vehicle damper commands include four components, a current to be applied to a damper 13 if it is in extension, a current to be applied to a damper 13 if it is in compression, an arbitration value and an enumeration value.

The arbitration value is a number, preferably ranging from 0 to 1.0, representing the weight to be given to the vehicle damper command. The arbitration value represents the magnitude of error between intended vehicle behavior and actual vehicle behavior.

The enumeration value provides an indication of whether or not any of the vehicle damper commands should be processed by the damper controller 25 or ignored. The vehicle damper command should be processed if the particular damper 13 is traveling in a direction deemed critical for yaw control. For example, the enumeration value could be numbers where "0" indicates that the vehicle damper command should be ignored, "3" indicates that the vehicle damper command should be processed if the damper 13 is traveling in either direction, i.e., extension or compression, "5" indicates that the vehicle damper command should be processed if the damper 13 is in a compression mode, and "6" indicates that the vehicle damper command should be processed if the damper 13 is in an extension mode.

Simultaneously, as shown at step 112, the damper controller 25 also generates sub-system damper commands for each of the dampers for normal R&H control. These commands are typically generated on fewer parameters than the vehicle damper commands.

Next, the method proceeds to step 114 where a determination is made as to whether or not any of the vehicle damper commands should be utilized. The damper controller 25 examines the enumeration value to determine if the particular damper 13 being controlled is traveling in a direction deemed critical for vehicle supervisory control. If the damper 13 is in an extension mode, yet the enumeration value represents that either the vehicle damper command should be ignored or should be processed if the damper 13 is in a compression mode, e.g., either "0" or "5" utilizing the example above, then the method proceeds to step 116 wherein the damper controller 25 will ignore the vehicle damper command and instead control the damper 13 using the sub-system damper command as originally determined by the damper controller 25.

However, if the damper 13 is in a compression mode, and the enumeration value indicates that the vehicle damper command should be processed if the damper is in a compression mode, e.g. "5" as indicated in the example above, the method proceeds to step 118 wherein the damper controller 25 determines a modified sub-system damper command for the damper 13 based on the supervisory vehicle damper command. Here, the arbitration value comes into play so that the damper controller 25 knows what weight to give to the supervisory vehicle damper command. In the preferred embodiment, the modified sub-system damper command is determined according to:

$$SSDC*(1-Arb.\ Value)+(VDC*Arb.\ Value),$$

where:

SSDC is the original sub-system damper command, or current command,

Arb. Value is the arbitration value, and

VDC is the vehicle damper command, or current command.

After determining the new modified sub-system damper command, the damper controller 25 controls the damper 13 using the new modified sub-system damper command, as shown at step 120.

Although not shown, the method can include a step wherein the damper controller 25 sends a feedback signal to the supervisory controller 10 representing the enumeration value it received to confirm that the damper controller 25 is exercising the correct control.

The method and system of the present invention provides a way in which to exercise supervisory control by the vehicle stability control system when necessary, but yet also allow the damper controller 25 to control the dampers without delay according to its own R&H control methodology.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for coordinating a vehicle stability control system of a vehicle with a suspension damper control sub-system that is in electrical communication with the vehicle stability control system, the vehicle having a plurality of dampers, each of the dampers controlled directly by the suspension damper control sub-system, the method comprising:

generating vehicle damper commands for each of the dampers, the vehicle damper commands being generated by the vehicle stability control system for controlling vehicle stability, said vehicle damper commands being received by the suspension damper control sub-system;

generating sub-system damper commands for each of the dampers, the sub-system damper commands being separately generated by the suspension damper control sub-system for controlling vehicle suspension;

determining if any of the vehicle damper commands for any one of the dampers has authority over the corresponding sub-system damper command, which further comprises determining if any one of the dampers is traveling in a direction deemed critical for vehicle yaw control;

determining a modified sub-system damper command for each of the dampers in which the corresponding vehicle damper command has authority, the modified sub-system damper command being determined based on the vehicle damper command and the sub-system damper command; and controlling each of the plurality of dampers based on: (i) the corresponding sub-system damper command, when the corresponding vehicle damper command has been determined not to have authority over the corresponding sub-system damper command, and (ii) the corresponding modified sub-system damper command, when the corresponding vehicle damper command has been determined to have authority over the corresponding sub-system damper command.

2. The method as recited in claim 1 wherein generating vehicle damper commands includes generating an enumeration value indicating a direction of travel to be deemed critical and wherein determining if any one of the dampers is traveling in a direction deemed critical for vehicle yaw control comprises:

determining a direction of damper travel for each of the dampers; and determining if the direction of travel for any of the dampers corresponds to the enumeration value.

3. The method as recited in claim 1 wherein the vehicle damper command includes an arbitration value indicating a weight to be given to the vehicle damper command and wherein determining the modified sub-system damper command includes determining the modified sub-system damper command based on the vehicle damper command, the sub-system damper command and the arbitration value.

4. The method as recited in claim 3 wherein the modified sub-system damper command is determined by:

$$SSDC * (1-Arb.\ Value)+(VDC*Arb.\ Value),$$

where,

SSDC is sub-system damper command,

Arb. Value is the arbitration value, and

VDC is vehicle damper command.

5. The method as recited in claim 3 wherein determining the arbitration value includes:

determining an intended behavior of the vehicle based on an action taken by an operator of the vehicle;

determining an actual behavior of the vehicle in response to the action taken by the operator based on the vehicle parameters; and determining a difference between the intended behavior of the vehicle and the actual behavior of the vehicle.

6. The method as recited in claim 3 wherein the arbitration value has a value ranging from 0 to 1.0.

7. The method as recited in claim 1 wherein the vehicle damper commands, the sub-system damper commands and the modified sub-system damper commands include current signals.

* * * * *